(12) United States Patent
Lynch (10) Patent No.: US 9,658,321 B2
(45) Date of Patent: May 23, 2017

(54) METHOD AND APPARATUS FOR REDUCING NOISE IN A CODED APERTURE RADAR

(71) Applicant: HRL LABORATORIES LLC, Malibu, CA (US)

(72) Inventor: Jonathan J. Lynch, Oxnard, CA (US)

(73) Assignee: HRL Laboratories, LLC, Malibu, CA (US)

( * ) Notice: Subject to any disclaimer, the term of this patent is extended or adjusted under 35 U.S.C. 154(b) by 139 days.

(21) Appl. No.: 14/561,142

(22) Filed: Dec. 4, 2014

(65) Prior Publication Data

US 2015/0160331 A1 Jun. 11, 2015

Related U.S. Application Data

(60) Provisional application No. 61/912,990, filed on Dec. 6, 2013.

(51) Int. Cl.
| | | |
|---|---|---|
| *G01S 13/34* | (2006.01) | |
| *G01S 7/28* | (2006.01) | |
| *G01S 7/02* | (2006.01) | |
| *G01S 13/02* | (2006.01) | |
| *G01S 13/44* | (2006.01) | |

(Continued)

(52) U.S. Cl.
CPC .............. *G01S 7/2813* (2013.01); *G01S 7/02* (2013.01); *G01S 13/02* (2013.01); *G01S 13/343* (2013.01); *G01S 13/4418* (2013.01); *G01S 13/4463* (2013.01); *G01S 13/536* (2013.01); *G01S 13/882* (2013.01); *G01S 13/931* (2013.01); *G01S 13/94* (2013.01); *G01S 2007/356* (2013.01)

(58) Field of Classification Search
CPC .... G01S 13/02; G01S 13/343; G01S 13/4418; G01S 13/4463; G01S 13/536; G01S 13/882; G01S 13/931; G01S 13/94; G01S 2007/356; G01S 7/02; G01S 7/2813
USPC ........................................ 342/105, 128, 200
See application file for complete search history.

(56) References Cited

U.S. PATENT DOCUMENTS

| | | |
|---|---|---|
| 3,852,753 A | 12/1974 | Blakemore |
| 4,649,393 A | 3/1987 | Rittenbach |

(Continued)

OTHER PUBLICATIONS

From U.S. Appl. No. 13/725,621 (now published as US 2013-0169485 A1), Office Action mailed on Aug. 20, 2015.

(Continued)

*Primary Examiner* — Timothy A Brainard
(74) *Attorney, Agent, or Firm* — Ladas & Parry (57) ABSTRACT

A method and apparatus for reducing noise in a coded aperture radar system, the coded aperture radar system transmitting signals which occur in sweeps, with K sweeps utilized to cover field of view of the coded aperture radar system and Q frequency shifts or steps occurring each sweep thereof. An array of N antenna elements is provided, the array of antenna elements each having an associated two state modulator coupled therewith. Energy received at the array is modulated according to a sequence of multibit codes, the number of codes in the sequence of codes comprising at least K times Q times N, thereby reducing noise in the coded aperture radar system compared to a coded aperture radar system radar system having fewer than K times Q times N codes in its sequence of multibit codes.

21 Claims, 6 Drawing Sheets

(51) Int. Cl.
  *G01S 13/536* (2006.01)
  *G01S 7/35* (2006.01)
  *G01S 13/88* (2006.01)
  *G01S 13/93* (2006.01)
  *G01S 13/94* (2006.01)

(56) References Cited

U.S. PATENT DOCUMENTS

| | | | |
|---|---|---|---|
| 5,940,029 A | 8/1999 | Ninomiya | |
| 5,945,947 A | 8/1999 | Cunningham | |
| 5,955,985 A | 9/1999 | Kemkemian | |
| 6,266,010 B1 | 7/2001 | Ammar | |
| 6,384,784 B1 | 5/2002 | Gumm | |
| 6,914,559 B2 | 7/2005 | Marks | |
| 7,151,478 B1* | 12/2006 | Adams | G01S 13/325 244/3.1 |
| 7,224,314 B2 | 5/2007 | Lee | |
| 7,277,046 B2 | 10/2007 | Adams et al. | |
| 2003/0025629 A1 | 2/2003 | Barrick | |
| 2003/0210185 A1 | 11/2003 | Hager et al. | |
| 2004/0252047 A1 | 12/2004 | Miyake et al. | |
| 2005/0275585 A1 | 12/2005 | Shima | |
| 2006/0119513 A1 | 6/2006 | Lee | |
| 2007/0046540 A1 | 3/2007 | Taenzer | |
| 2007/0052580 A1 | 3/2007 | Fiore | |
| 2007/0239002 A1* | 10/2007 | Alam | G01S 7/52093 600/437 |
| 2008/0129595 A1 | 6/2008 | Choi | |
| 2009/0079617 A1 | 3/2009 | Shirakawa | |
| 2009/0103593 A1 | 4/2009 | Bergamo | |
| 2009/0239551 A1 | 9/2009 | Woodsum | |
| 2009/0251361 A1 | 10/2009 | Beasley | |
| 2009/0310649 A1 | 12/2009 | Fisher et al. | |
| 2012/0092211 A1 | 4/2012 | Hampel et al. | |
| 2013/0169471 A1 | 7/2013 | Lynch | |
| 2013/0169485 A1 | 7/2013 | Lynch | |
| 2014/0111367 A1 | 4/2014 | Kishigami | |

OTHER PUBLICATIONS

EPO Supplementary European Search Report from European Patent Application No. 12872244.4 dated Aug. 21, 2015.
EPO Office Action from European Patent Application No. 12872244.4 dated Sep. 3, 2015.
PCT International Search Report and Written Opinion from PCT/US2014/068669 dated Aug. 28, 2015.
U.S. Appl. No. 14/561,111, filed Dec. 4, 2014, Lynche et al.
Dr. Macros A. Bergamo, "Spread Spectrum Digital Beamforming (SSDBF)," IEEE. Pages 665-672, (2010).
M.I. Skolnik, "Introduction to Radar Systems (third edition)," McGraw-Hill, NY, Section 5.2, pp. 276-284 and pp. 305-309, (2001).
Adamy, "EW 103: Tactical Battlefield Communication Electronic Warfare," published by Artech House with relevance to "EW 101: A First Course in Electronic Warefare," pp. 209, 211-212 and 214, (2008).
R.O. Schmidt, "Multiple Emitter Location and Parameter Estimation," IEEE Trans. Antennas Propagation, vol. AP-34, No. 3, (Mar. 1986).
S. Drabowich and C. Aubrya, "Pattern Compression by Space-Time Binary Coding of an Array Antenna," Advance Radar Systems, AGARD Conference Proceedings, No. 66, 14/1-14/9, (1970).
From U.S. Appl. No, 14/561,111, Applications and Office Actions.
From U.S. Appl. No. 13/725,621 (now U.S. Publication No. US 2013-0169485 A1), Final Office Action mailed on Apr. 21, 2015.
International Search Report and Written Opinion from PCT/US2012/071501 mailed Sep. 27, 2013.
PCT International Preliminary Report on Patentability (Chapter II) mailed on Feb. 27, 2014 for related PCT/US2012/071501.
International Search Report and Written Opinion from PCT/US2014/068668 mailed Mar. 5, 2015.
From U.S. Appl. No. 13/490,607 (now U.S. Publication No. US 2013-0169471 A1), Non-Final Office Action mailed on Nov. 18, 2014.
From U.S. Appl. No. 13/725,621 (now U.S. Publication No. US 2013-0169485 A1), Final Office Action mailed on Nov. 18, 2014.
From U.S. Appl. No. 13/725,621 (Now Published as 2013/0169485), Non-Final Rejection mailed on Nov. 30, 2015.
EPO Extended Search Opinion from European Patent Application No. 12872244.4 dated Sep. 25, 2015 with EPO transmittal letter of Sep. 28, 2015.
From U.S. Appl. No. 14/561,111 (published as US 2015-0160335 A1), Office Action mailed on Aug. 22, 2016.
Office action from related Chinese Patent Application No. 201280064222.9 dated Oct. 23, 2015 with brief English summary.
Office action from related Chinese Patent Application No. 201280064222.9 dated Jul. 25, 2016 and its English translation.
Chapter II, International Preliminary Report on Patentability (IPRP) from PCT/US2014/068669, dated on May 9, 2016.
From U.S. Appl. No. 13/725,621 (now published as US 2013-0169485), Office Action mailed on Jun. 14, 2016.

* cited by examiner

METHOD AND APPARATUS FOR REDUCING NOISE IN A CODED APERTURE RADAR

CROSS REFERENCE TO RELATED APPLICATIONS

This application claims the benefit of U.S. Provisional Patent Application Ser. No. 61/912,990, filed Dec. 6, 2013 and entitled "A Method and Apparatus for Processing Coded Aperture Radar Signals" and is related to U.S. patent application Ser. No. 14/561,111 filed on the same date as this application and entitled "Method and Apparatus for Processing Coded Aperture (CAR) Radar Signals". The disclosure of that U.S. Provisional Patent Application Ser. No. 61/912,990 and the U.S. patent application Ser. No. 14/561,111 identified above are hereby incorporated herein by this reference.

This application is related to U.S. patent application Ser. No. 13/490,607 filed Jun. 7, 2012 and entitled "Coded Aperture Beam Analysis Method and Apparatus", the disclosure of which is hereby incorporated herein by reference.

This application is also related to U.S. patent application Ser. No. 13/725,621 filed Dec. 21, 2012 and entitled "Coded Aperture Beam Analysis Method and Apparatus", the disclosure of which is hereby incorporated herein by reference.

STATEMENT REGARDING FEDERALLY SPONSORED RESEARCH OR DEVELOPMENT

None.

TECHNICAL FIELD

This invention teaches a method of coding for use with Coded Aperture Radar (CAR) that reduces ambiguity (sometimes called "multiplicative noise") that is typically present as a result of aperture coding. The novelty of this invention is that it minimizes ambiguity in the radar signals while providing complete information of objects' range, radial velocity, and angular location within a prescribed field of view. The invention retains all of the advantages of CAR while improving the radar performance through reduction of ambiguity.

BACKGROUND

CAR is different than a conventional phased array radar. Sensitivity is often limited in CAR compared to a conventional phased array radar because energy is typically collected in a relatively short period of time, consisting of a single radar range/Doppler acquisition when using CAR. Because of this the total received energy is lower than, say, a conventional phased array radar that forms a directive beam but then collects energy over a longer period of time by sequentially moving the beam to all beam directions within the field of view. For example, if N beams fill the field of view, then a conventional phased array radar requires one acquisition period at each beam position, so the total energy will be N times greater than for CAR. Two type of CAR (Type I and Type II) are identified in U.S. Provisional Patent Application Ser. No. 61/912,990, filed Dec. 6, 2013 and entitled "A Method and Apparatus for Processing Coded Aperture Radar Signals" and U.S. patent application Ser. No. 14/561,111 filed on the same date as this application and entitled "Method and Apparatus for Processing Coded Aperture (CAR) Radar Signals". This disclosure described in greater detail Type II CAR and in particular how it reduces ambiguity (from multiplicative noise) compared to Type I CAR.

If one extends the Type I CAR acquisition period a factor of N then the sensitivity of CAR will be the same as for a conventional phased array (other things being equal). However, in that case the number of Doppler bins increases a factor of N, increasing the computational overhead of the Type I CAR system.

Given the typical lower sensitivity of a Type I CAR coded radar system, it can effectively be employed where a short range radar can be used, for example, as an automotive radar, for rotorcraft landing in degraded visual environments, proximity sensors, aircraft altimeters (used using landing), for aircraft maneuvering on a taxiway or on an aircraft carrier, etc. However, as noted above, the sensitivity of a Type I CAR coded radar system can be increased if needed.

Type I CAR provides a method and apparatus for acquiring information about the 3D location and radial velocity of a continuum of scatterers within a relatively short acquisition period compared to conventional radar as mentioned above. The Type I CAR technique has been previously made the subject of patent applications (see the US Patent Applications identified above), along with suggestions for coding the single bit phase shifters located at each aperture transmitting and/or receiving element. However, the previously disclosed techniques produce a uniformly distributed ambiguity, sometimes called residual ambiguity or multiplicative noise, which reduces the sensitivity and dynamic range of the radar.

Type II CAR described herein addresses this residual ambiguity or multiplicative noise associated with Type I CAR.

BRIEF DESCRIPTION OF THE INVENTION

This invention reduces the distributed ambiguity noted above by including additional measurements over the previous CAR coding schemes described in the two above-identified US Patent Applications. The additional measurements provide a sufficient set for inverting the aperture code and determining the element signals. Once the element signals are determined, one may use linear combinations of the signals to computationally define effective beams in any desired direction and with specific sidelobe characteristics. The reduction of ambiguity is important for radar sensors so that maximum sensitivity and dynamic range may be achieved.

In one aspect the present invention provides a radar system for determining range, range rate (velocity) and bearing angles of a target reflecting at least one transmitted RF signal, the radar system comprising: a transmitter for transmitting the at least one transmitted RF signal, the transmitted signal changing in frequency during each sweep made by the radar system, the transmitter making K sweeps and each sweep having Q frequency shifts per sweep; an array of N antenna elements for receiving the at least one RF signal; an array of single bit modulators, each single bit modulator in said array of single bit modulators being coupled with a corresponding antenna element or with a corresponding subgroup of said antenna elements in said array of antenna elements for modulating signals from the corresponding antenna elements according to a multibit code, wherein the number unique codes from which said multibit code is selected is equal to at least N; a mixer; a summation network for applying a summation of signals from the array of single bit modulators to said mixer, the mixer converting the summation of signals either to baseband or to intermediate frequency analog signals; an analog to digital convertor for detecting and converting the baseband or intermediate frequency analog signals from the mixer to corresponding digital signals; and means for analyzing the corresponding digital signals to determine the direction of arrival of the at least at least one RF signal from the at least one emitting source of the at least one RF signal.

In another aspect the present invention provides a method for determining the range (and preferably also the range rate and bearing angles) of one or more scattering objects reflecting radar signals which occur in sweeps, with K sweeps and Q frequency shifts occurring during at least one sweep, the method comprising: utilizing an array of N antenna elements, the array of antenna elements each antenna element in said array having an associated two state modulator; coded energy received at said array according to a sequence of multibit codes, the number of codes in said sequence of codes comprising at least N per frequency step; to thereby allow the determination of range through digital computation after the scattered signals have been received.

In still yet another aspect the present invention provides a method for reducing multiplicative noise in a coded aperture radar system, the radar system transmitting signals which occur in sweeps, with K sweeps utilized to cover field of view and Q frequency shifts occurring during at least one sweep, the method comprising: utilizing an array of N antenna elements, the array of antenna elements each having an associated two state modulator coupled therewith; coding energy received at said array according to a sequence of multibit codes, the number of codes in said sequence of codes comprising at least N times K times Q; to thereby reduce multiplicative noise in said radar system compared to a coded aperture radar system radar system having fewer than at least N times K times Q codes in its sequence of multibit codes.

In yet another aspect the present invention provides a method of improving the sensitivity and dynamic range of a radar system performing radar sweeps of a field of view, each sweep having a different transmit frequency associated therewith, the method comprising using a set of N aperture codes to control N single bit modulators during each frequency step of the radar system, the N single bit modulators each being coupled to a single antenna element of an array of N antenna elements of the radar system.

BRIEF DESCRIPTION OF THE DRAWINGS

FIGS. 5a-5d relate to a simulation of CAR using a coding technique with a single different code for each frequency step.

FIGS. 6a-6d relate to another simulation of CAR using a coding technique with a different code for each frequency sweep.

DETAILED DESCRIPTION

The technique described herein utilizes additional measurements made in a time period that is constrained by range and velocity discretization. As a result this technique requires a faster analog to digital converter (ADC) than the techniques used in the US Patent Applications referenced above. But an advantage compared to the US Patent Applications referenced above is that the residual ambiguity is lower than the previous applications.

Figure 1:
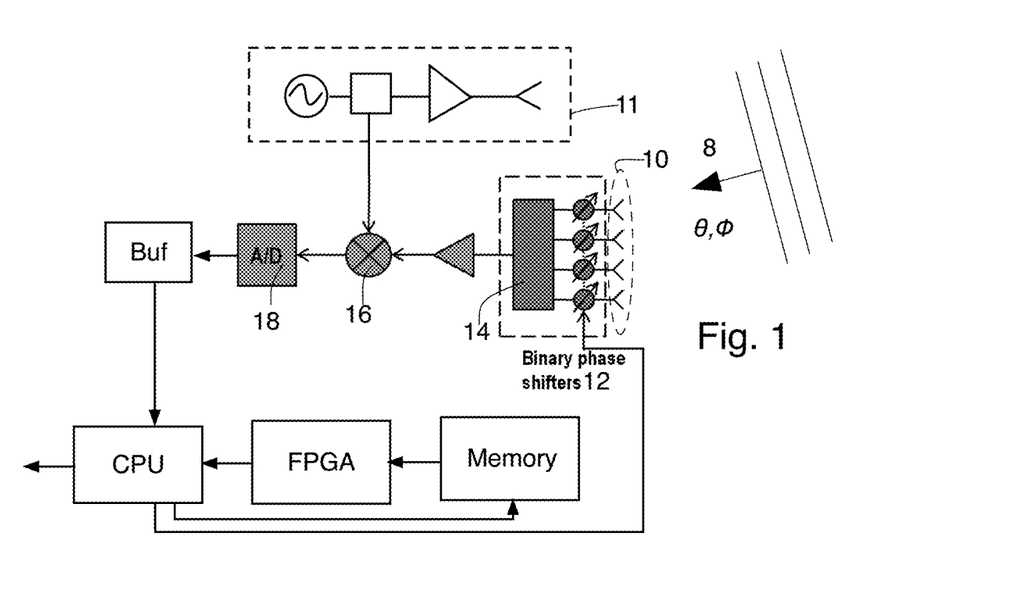
FIG. 1 is a block diagram of an embodiment of the invention and schematically depicts a homodyne radar with CAR coding on receive only.

FIG. 1 shows a block diagram of a CAR coded radar, with CAR coding being employed, for simplicity's sake, only on the receive portion of the radar. The possibility of using CAR on the transmitted signal as well is discussed towards the end of this patent. The radar is much simpler to design (and is much less complicated to implement, and thus less computationally expensive) if the CAR coding disclosed herein is employed at the only receiver side of the radar. As such, the receive only embodiments disclosed herein are preferred for a low cost, close range radar systems such as might be used in automobiles, for example, or other such applications where having a relatively short target acquisition time period compared to conventional radar can be extremely important.

A signal is transmitted over a field of view by a radar transmitter 11 and the scattered energy 8 (from one or more targets) is received by an array of receiving elements 10 (the array 10, in practice, is preferably a two dimensional array, but a one dimensional array is more convenient for analysis and simulation and may be used in practice). Each of the received signals is phase shifted (modulated) by either zero or 180 degrees by an array of 1-bit phase shifters 12. Preferably, there is a one-to-one relationship between antenna elements 10 and phase shifters 12. But it is possible, in some embodiments (see FIG. 3a), to have several antenna elements 10 grouped together (summed in a subarray $10_{SA}$) that are then coupled with a single phase shifter 12. The drawback to this approach is the appearance of grating lobes in the element patterns because the subarrays would be spaced greater than $\lambda/2$ apart from one another (where $\lambda$ is the wavelength of the nominal frequency of the radar system). Grating lobes are undesirable because they reduce gain and produce spurious radiation in unwanted directions.

The advantage is lower cost. Only a few antenna elements 10 and phase shifters 12 are depicted in FIGS. 3 and 3a for ease of illustrational and explanation, it being understood that actual embodiments of the inventions described herein would likely employ many more such antenna elements 10 and phase shifters 12.

The received scattered signals are phase shifted (or not) depending on the state of a control word, a bit of which is applied to each binary phase shifter 10 (thus controlling whether it performs a 180 degree phase shift (or not) on the received scattered signals). The control words are preferably generated pseudo-randomly. The phase shifted (i.e., aperture coded) signals output from the 1-bit phase shifters 12 are then summed at a summer 14. The output of the summer 14 is an output port. The signal may be amplified if needed, by an amplifier 15 and then down-converted at a mixer 16 and digitized by an A/D converter 18. The embodiments of FIGS. 3 and 3a have a single output port, but it is also possible to sum down to more than one port (e.g., 2, 4, etc.) and digitize each port independently using multiple A/D converters 18 as depicted by the embodiment of FIG. 3b. The advantage to this is an increase in the collected energy, improving sensitivity. The disadvantage is increased cost since the number of ASICs (discussed below) doubles if the number of ports double, quadruples if the number of ports quadruple, etc.

Figure 3:
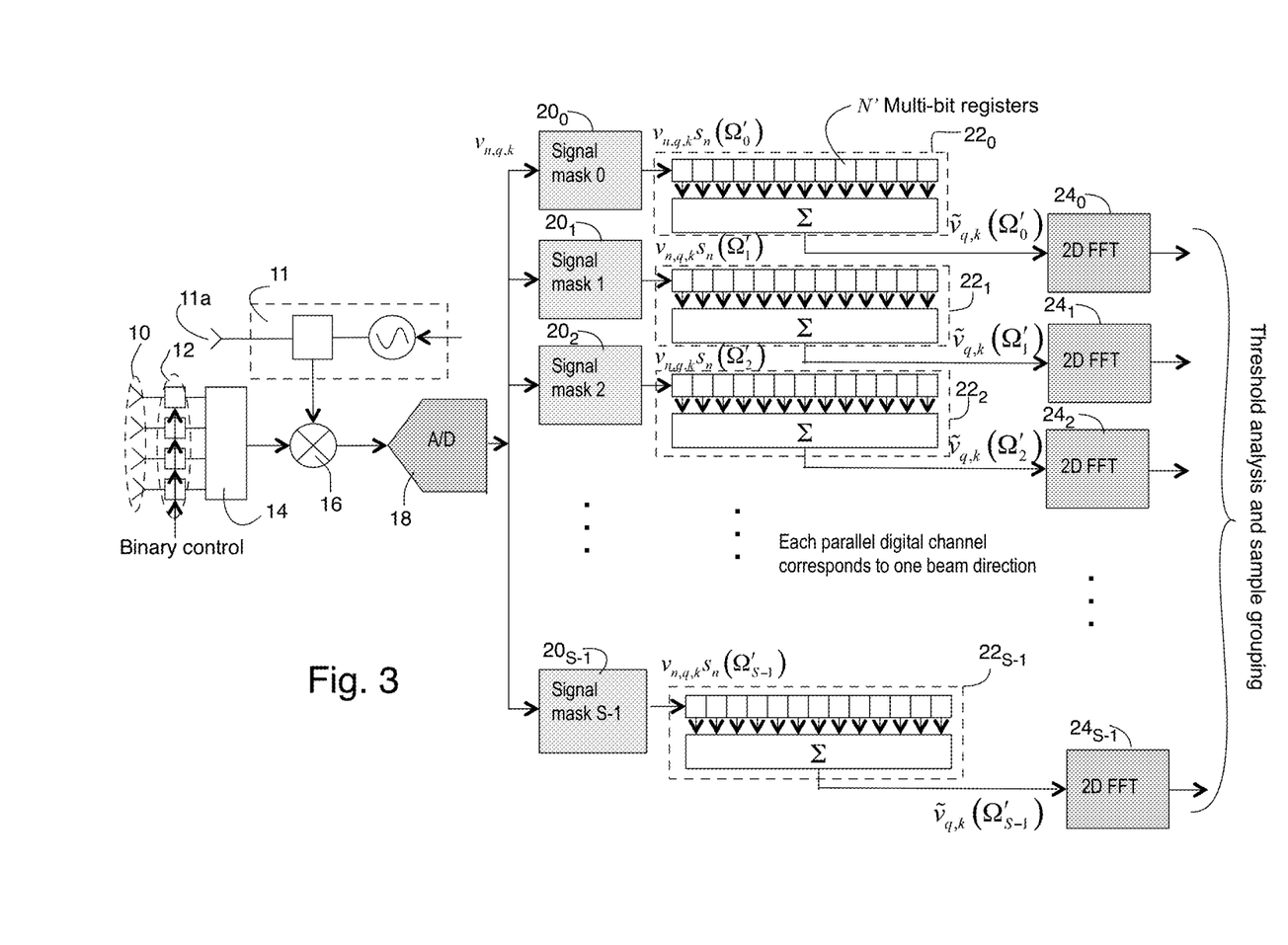
FIG. 3 is a block diagram showing the CAR processing technique described herein where a one to one relationship between antenna elements and 1-bit phase shifters is utilized.
Figure 3A:
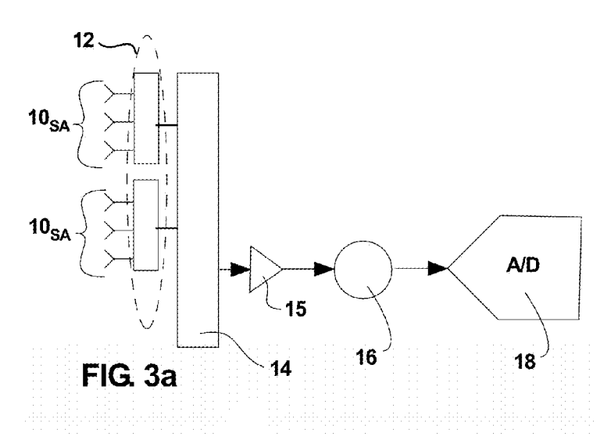
FIG. 3a shows an alternative embodiment of the CAR processing where multiple antenna elements (in a subarray of antenna elements) share a single 1-but phase shifter.
Figure 3B:
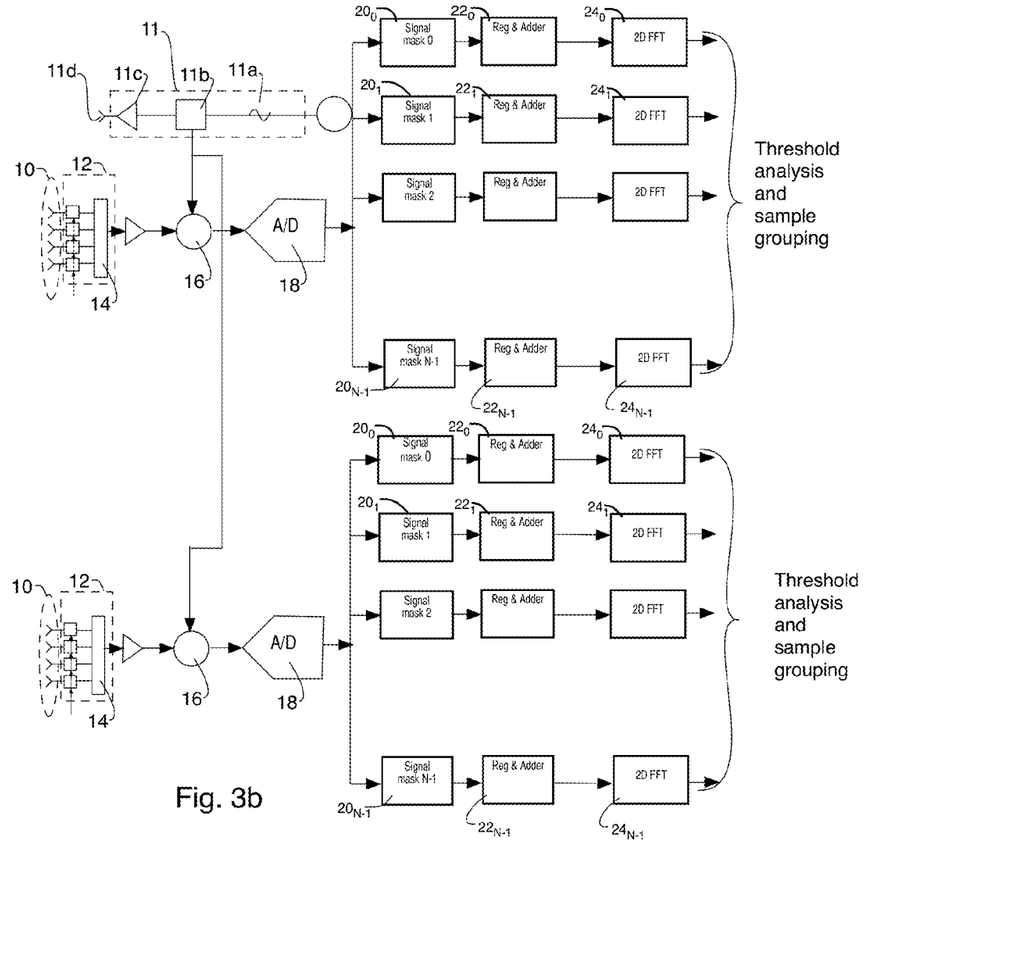
FIG. 3b shows another alternative embodiment of the CAR processing technique described herein where a one to one relationship between antenna elements and 1-bit phase shifters is maintained, but where outputs of the antenna elements are the summed down to more than one port which ports are digitized independently by more than one A/D convertor.
Figure 4A:
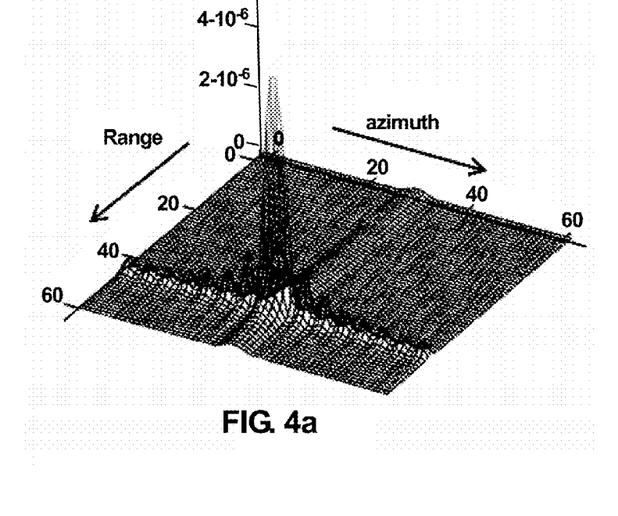
FIGS. 4a-4d relate to a simulation of the CAR radar disclosed herein with a common set of codes used at each frequency step, FIG. 4a being a graph of the 2D range/azimuth cut with the reference velocity equal to 10 m/sec. The graphs of FIGS. 4b-4d are 1D cuts of range, azimuth and velocity, respectively.
Figure 4B:
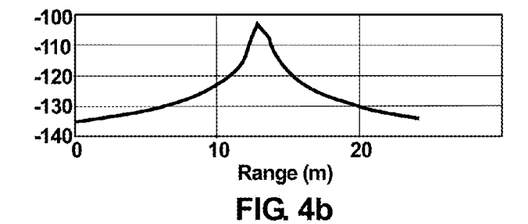
Figure 4C:
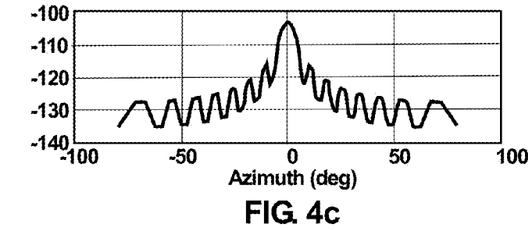
Figure 4D:
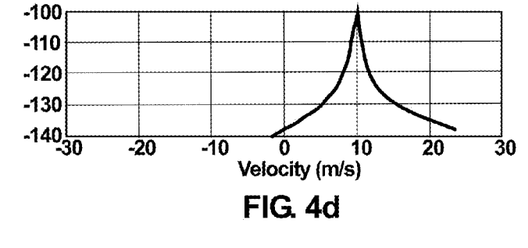
Figure 5A:
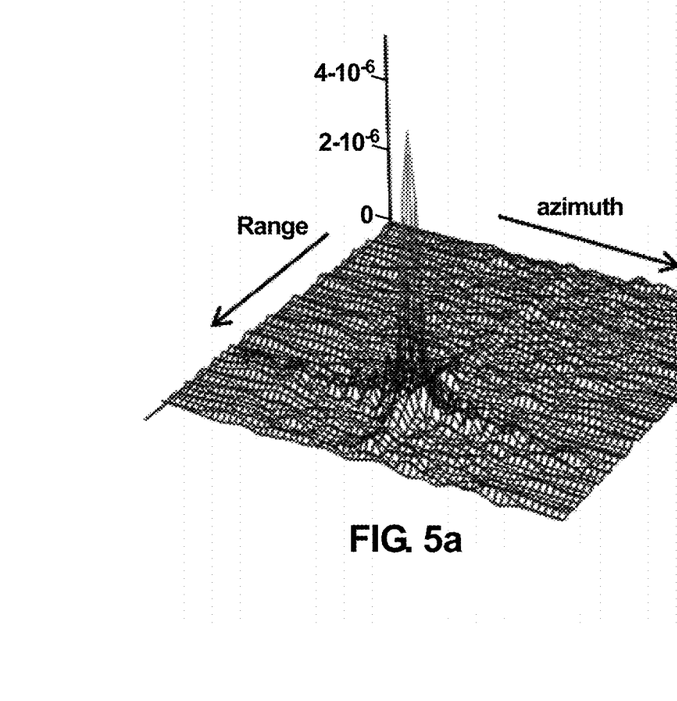
FIG. 5a is a graph of the 2D range/azimuth cut with the reference velocity equals to 10 m/sec, while the graphs of FIGS. 5b-5d are 1D cuts of range, azimuth and velocity, respectively. The multiplicative noise is evident throughout range, velocity, and bearing angle spaces.
Figures 5B, 5C:
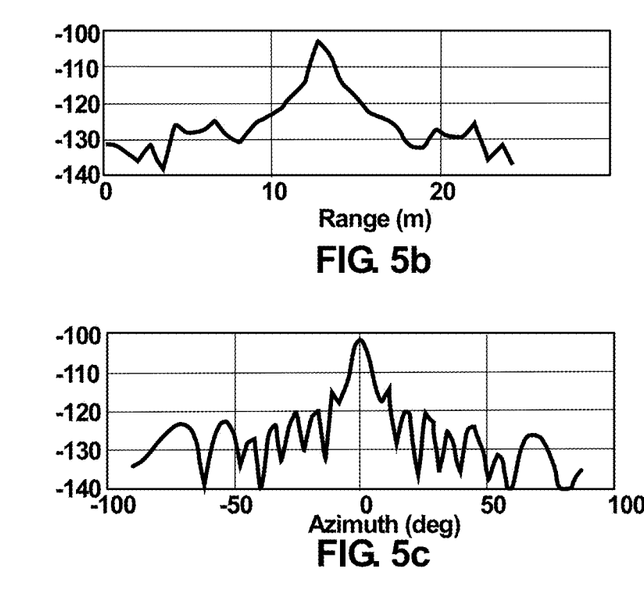
Figure 5D:
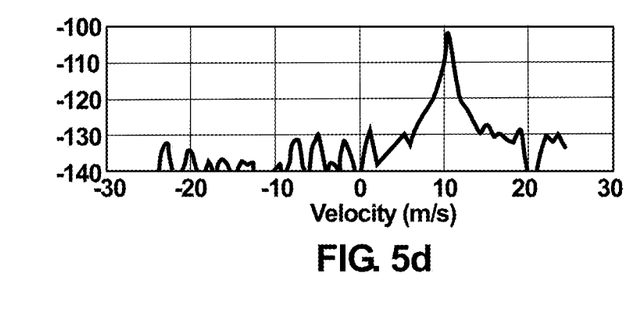
Figure 6A:
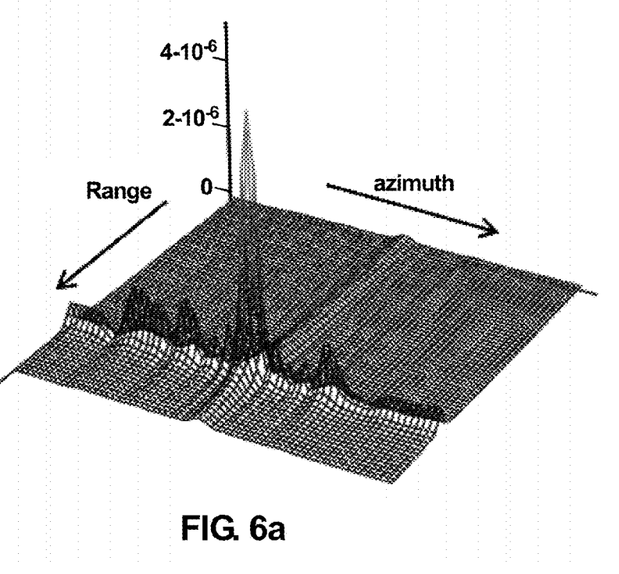
FIG. 6a is a graph of the 2D range/azimuth cut with the reference velocity equals to 10 m/sec, while the graphs of FIGS. 6b-6d are 1D cuts of range, azimuth and velocity, respectively. The multiplicative noise is now confined to the velocity and angle spaces and is absent from the range space.
Figure 6B:
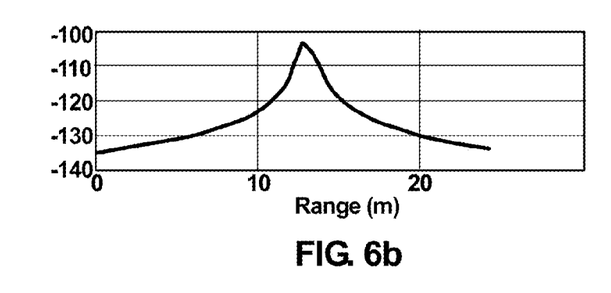
Figure 6C:
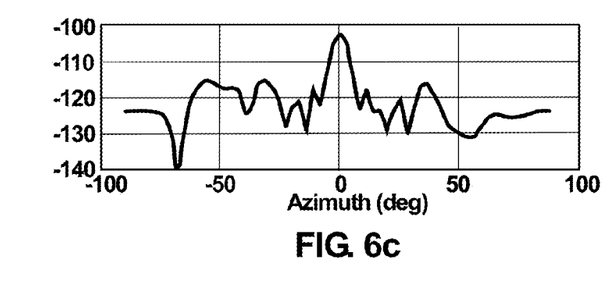
Figure 6D:
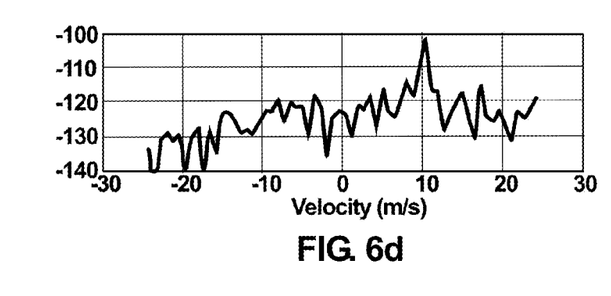

The radar transmitter 11 which is in the embodiments of FIGS. 3, 3a and 3b (with CAR coding on the receiver side only) may be a standard FMCW radar architecture 11 that is well known to those skilled in the art. In automotive or other land vehicle applications, the radar will likely use a "homodyne" downconversion (swept LO) to baseband, which is typically from DC to a few MHz. In block 11, element 11a is a voltage controlled oscillator (VCO) that outputs, in one particular embodiment, a 76.5 GHz frequency modulated signal (other frequencies may be used). Element 11b is a coupler that splits the VCO output signal and sends preferably a portion to the local oscillator port of the mixer 16. The remaining portion of the VCO power is preferably sent to a power amplifier 11c, and then, after leaving the transmitter block 11, to a transmitting antenna 11d.

Figure 2:
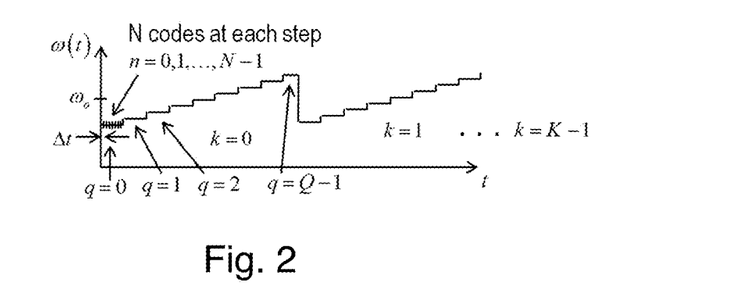
FIG. 2 shows that the instantaneous transmitted frequency preferably consists of a series of equal frequency steps that are repeated with N codes per step, Q steps per sweep, K sweeps per acquisition.

There are many possible transmitted radar signals, and one especially convenient one is a repetitive series of equal frequency steps, with preferably N codes per frequency step, as shown in FIG. 2. The number of codes per step (N) in the transmitted signal is preferably the same as the number (N) of antenna elements 10. The N transmitted codes (See FIG. 2) are preferably selected in the same manner (for example, pseudo-randomly) as the one-bit receive codes applied to the binary or one-bit phase shifters 12 but the resulting two matrices should not be chosen to be the same. Furthermore, since the transmit-receive code combination is just the product of the separate transmit and receive codes (it is well known to those skilled in the art that radar response is proportional to the product of the transmit modulation and receive modulation), the overall coding matrix is the element by element product of the transmit code matrix and the receive code matrix. One should therefore ensure that the overall coding matrix contains linearly independent columns.

In the prior patent applications noted above coding is implemented using pseudo-random phase shifter states with either one code (set of states) per sweep or one code per frequency step. One could alternatively use frequency hopping, sinusoidal modulation, etc. for the transmitted signals, but the use of linear FM (FMCW) allows the disclosed embodiments to use Fast Fourier Transform (FFT) processing in the receiver which is depicted in greater detail by FIGS. 3 and 3b. FIGS. 3 and 3b repeat much of what is shown in FIG. 1, but shows the FFT processing (preferably performed by one or more CPUs or Digital Signal Processors (DSPs)) done by the FFT functions $24_0$-$24_{S-1}$ depicted for the embodiments of FIGS. 3 and 3b. The CPU of FIG. 1 could conceivably do all of the required FFT processing, but allocating the FFT processing to one or more Application Specific ICs (ASICs), each of which would function as a FFT CPU or FFT DSP, would computationally make more sense. These ASICs should preferably also perform the multiplication needed for the S signal mask functions $20_0$-$20_{S-1}$ which are described in greater detail below. While there could be a one-to-one relationship between the number of ASICs utilized and the number of FFT functions $24_0$-$24_{S-1}$ and the number of S signal mask functions $20_0$-$20_{S-1}$ depicted for the embodiments of FIGS. 3 and 3b, it is preferable to implement all S digital channels in a single ASIC as that would likely lead to a lower cost of implementation than would the use of multiple ASICs. So for the embodiment of FIG. 3, the total number of ASICs is preferably equal to just one.

Referring again to FIG. 3, in the receiver, after the down converted signal is digitized at the A/D converter 18, the signal is preferably split into S parallel channels, where S is the number of beams that will be computationally defined in parallel and also preferably where S=N is the number of antenna elements. Since this is a digital beamforming approach, the reference here to "beams" is not to real physical high-gain RF beams, but rather to "effective" beams that are formed (or defined) digitally after data collection. The number of channels is preferably equal to the number of effective beams that are digitally formed at the same time (in parallel), by, for example, the CPU of FIG. 1 or more preferably by the single ASIC mentioned above.

The value of S (the number of channels) is typically equal to the number of antenna elements 10 (and the number of phase shifters 12), but one can use a smaller value of S if latency is not an issue—in which case the FFT processing of the "effective" beams may be done sequentially as opposed to all as the same time as suggested by the embodiments of FIGS. 3 and 3a. So if the number of channels were S=N/2 (where S is the number of beams that will be computationally defined in parallel and N is the number of antenna elements), then the processing would take twice as long to process all beams. One can also use a smaller value of N if only a portion of the field of view (FOV) is to be initially examined. In this latter case the signal mask functions $20_0$-$20_{S-1}$ would very likely vary over time to focus attention on the portion of the FOV of initial interest.

Nevertheless, while a lower value of S (say N/2) can be utilized for the number of channels (and the number of ASICs), the embodiment of FIG. 3 is more robust in that all N beams can be computationally defined in parallel (i.e., at the same time). And the embodiment of FIG. 3b is still even more robust, but the number of channels then increases to say 2N, while still processing N beams in parallel.

The S signal mask functions $20_0$-$20_{S-1}$ are each simply the multiplication of each data sample from the A/D converter 18 with a value stored in memory of FIG. 1 for each effective beam position. The data samples are complex (with real and imaginary parts) because the mixer has in-phase and quadrature outputs that are separately digitized by A/D converters. It is common to depict this process with a single mixer and A/D converter, as done in the figures here, with the understanding that the signals are complex. There are a number of ways one can determine the values stored in memory (which are typically also complex numbers) of FIG. 1 which are used in the multiplication performed in the mask functions $20_0$-$20_{S-1}$ and one (preferred) method for determining these numbers will be explained below. These masks determine the angular beam pattern performance of the array, so the masks influence main beam direction, beam width, sidelobes, etc. They generally do not vary in time unless one desires to modify the beam pattern of the array over time. This is possible (and easily done) since all the beamforming is preferably done digitally.

During each acquisition there is a string of stored data samples whose length N' is preferably equal to the number of antenna elements N. The N' stored data samples (called a signal mask) multiply N' successive acquired signal samples and the results are summed to form one signal mask output value that corresponds to the N' successive input samples. This process is repeated for the next group of N' input samples to form the next signal mask output value. As a result, if there are M total samples in an acquisition, there will be M/N' output values for each signal mask. The resulting M/N' "masked" samples are then arranged (at least conceptually) in a 2D matrix, with each row corresponding to the samples of a particular sweep and the columns corresponding to sequential sweeps.

After multiplication by the signal mask, then groups of N' successive samples are summed together at each block $22_0$-$22_{S-1}$. Inside each block $22_0$-$22_{S-1}$ is depicted a register or memory capable of storing N' successive multi-bit pieces of data (each piece of data here being the result of the multiplication of one signal mask value with one acquired signal sample as described in the preceding paragraph) and a summer $\Sigma$ where the N' successive multi-bit pieces of data are summed together to "invert" the N-element code and produce a Q×K matrix for each antenna element 10. The real and imaginary parts are separately summed at summer $\Sigma$ to produce complex results. So N' successive samples are summed together and then this is repeated so that another N' successive samples are summed together, as so on. Following each summation, the resulting complex data value corresponds to a specific frequency step since the N' input values to the adder correspond to a single frequency step (see FIG. 2). Once this signal masking and addition is completed for the entire acquisition, the result will be a set of Q times K data values, where Q is the number of frequency steps per sweep and K is the number of sweeps per acquisition. This data may then be organized (at least conceptually) into a matrix with Q rows and K columns. The subsequent 2D FFT processing at blocks $24_0$-$24_{S-1}$ is then performed on this matrix of data, which processing is represented by the S 2D FFT functions $24_0$-$24_{S-1}$ depicted for the embodiments of FIGS. 3 and 3b. These operations are carried out in parallel for all of the S digital channels.

The result of the FFT processing is a matrix of data values for each channel whose amplitudes indicate the scattered energy at a particular range (row number), particular range rate (column number), and set of bearing angles (channel). This FFT processing is possible because the transmitted radar signal consists of a series of linear FM sweeps as shown by FIG. 2. A distinguishing feature of the CAR processing of FIGS. 3 and 3b is the multiplication of the signal by a stored signal mask (at the signal mask functions $20_0$-$20_{S-1}$) prior to applying the FFT processing (at the 2D FFT functions $24_0$-$24_{S-1}$).

The processing downstream of the A/D convertor 18 is described above with terms such a register, summer, linear combinations, FFT processing and are associated with blocks on a block diagrams, but is should be understood that it is preferred to embody all of the data processing downstream of the A/D convertor(s) 18 in an appropriately programmed digital processor as opposed to by using discrete digital circuits.

In contrast to the technique described in the prior patent applications referenced above, this invention utilizes a number (N) of codes (preferably equal to the number of antenna elements 12 and phase shifters 12) at each frequency step and repeats the same codes (usually in the same order each time, but not necessarily so) at each frequency step and also from sweep to sweep. The codes are generally not chosen pseudo-randomly, although they can be without loss of performance as long as the set of codes produces linearly independent field patterns. If the complex field pattern produced by the $n^{th}$ antenna element is denoted $e_n(\Omega)$, where $\Omega$ is shorthand notation for the spherical coordinate angles $\theta$, $\phi$, then the complex field pattern produced by the receive elements, phase shifters, and summation network may be written $$g_m(\Omega) = \sum_{n=0}^{N-1} S_{m,n} e_n(\Omega) \qquad \text{Eqn. (1)}$$

where $S_{m,n}$ is a "coding matrix," defined as the complex transmission coefficient (i.e., S21) from the $n^{th}$ element to the summation network output for the $m^{th}$ code.

The number N' of codes is preferably equal to the number of phase shifters 12 and antenna elements 10 as is discussed above (but not necessarily so, as is also discussed above). Increasing N' causes the multiplicative noise to drop and therefor one might well ask oneself if it might be a good idea to further increase N' so that it is greater than the number of phase shifters? When N' is equal to the number of phase shifters, one can invert the code and determine the signals at each element. This allows one to digitally form a set of beams by forming linear combinations of the phase shifted antenna element signals in an array, and the resulting range/Doppler/angle estimates are free from the type of ambiguity (which may be referred to as "residual ambiguity") that is due to N' being less than the number of elements (or phase shifters). Increasing the number N' to a number greater than the number of phase shifters is certainly possible, but such an embodiment is not believed to provide any additional performance benefits.

For a single ideal scatterer at range r, radial velocity v, and angular position $\Omega$, the mixer output voltage has the form $$v_{n',q,k} = e^{-j\frac{2\omega_q}{c}(r+v(n'+qN'+kQN')\Delta t)} g_{n'}(\Omega) = \qquad \text{Eqn. (2)}$$

$$e^{-j\frac{2\omega_q}{c}(r+v(n'+qN'+kQN')\Delta t)} \sum_{n=0}^{N-1} S_{n',n} e_n(\Omega)$$

where $\omega_q$ are the radian frequency steps and $\Delta t$ is the duration of each code (so that N'$\Delta t$ is the duration of each step, see FIG. 2). We will assume that the number of frequency steps is Q and the number of sweeps is K. These parameters are chosen to provide the desired range and velocity resolution. The range and velocity resolutions are given by $$\Delta r = \frac{c}{2\Delta f}, \qquad \text{Eqn. (3)}$$

$$\Delta v = \frac{c}{2f_o N'QK\Delta t}$$

Mathematically, the range and velocity variables run over positive and negative values, even though the negative range variables are meaningless in practice, so the maximum range and velocities (determined by the Nyquist criterion) are given by $$r_{max} = \frac{1}{2}Q\Delta r,$$ Eqn. (4)

$$v_{max} = \frac{1}{2}K\Delta v.$$

To determine the elements signals we must invert the aperture code, and this may be achieved in the following manner. We multiply the mixer output voltage in Eqn. (2) by the conjugate of the field pattern produced by the inverse or a pseudo-inverse (a pseudo-inverse is used when the S matrix is not square; if the number of unique codes is not equal to the number of elements, then a pseudo inverse must be used) of the code matrix:

$$\tilde{v}_{p,q,k} = \sum_{n'=0}^{N'-1} (S^{-1})_{p,n'} v_{n',q,k}$$ Eqn (5a)

and thus $$= \sum_{n'=0}^{N'-1} (S^{-1})_{p,n'} e^{-j\frac{2\omega_q}{c}(r+v(n'+qN'+kQN')\Delta t)} \sum_{n=0}^{N-1} S_{n',n} e_n(\Omega)$$ Eqn (5b)

and thus $$= e^{-j\frac{2\omega_q}{c}(r+v(qN'+kQN')\Delta t)} \sum_{n=0}^{N-1} e_n(\Omega) \sum_{n'=0}^{N'-1} (S^{-1})_{p,n'} S_{n',n} e^{-j\frac{2\omega_q}{c} vn'\Delta t}.$$ Eqn. (5c)

It may be noted that p appears here for the first time in the equations above. We will see below (Eqn. 9) that p is the index for the $p^{th}$ antenna array element. The matrix $S^{-1}$ is just the inverse of S. One may choose an orthonormal code matrix so that $S^H S$ is proportional to the identity matrix but this is not necessary. However, an orthonormal code matrix has the advantage of being optimally conditioned, so it is more tolerant to numerical errors.

For practical radars in accordance with this invention, the total acquisition time (or acquisition period) N'QK$\Delta$t is designed to be short enough so that the fastest expected targets will not move through more than one range bin during the acquisition period since such movements blurs the radar response. So it is preferable if the target stays within one range bin during an acquisition, and thus preferably moves no more than half a range bin per acquisition period. Thus a range bin is defined as equal to c/(2*$\Delta$f), where c is the speed of light and $\Delta$f is the RF bandwidth of the sweep. Given this definition, the movement during a single code duration $\Delta$t is often negligibly small. From Eqn. (5), if we assume $$\frac{2\omega_o}{c} v_{max} N'\Delta t \ll 1$$ Eqn. (6)

then the last exponential factor in Eqn. (5c) that depends on n' may be neglected with little error. Using Eqn. (3) and Eqn. (4), the condition above in Eqn. (6) may be expressed as $$Q \gg \pi,$$ Eqn. (7)

a condition that is often satisfied in practice because Q is the number of range bins and this is typically much larger than 3. Assuming that Eqn. (7) applies, Eqn. (5c) may be simplified to $$\tilde{v}_{p,q,k} = e^{-j\frac{2\omega_q}{c}(r+v(q+kQ)N'\Delta t)} \sum_{n=0}^{N-1} e_n(\Omega) \sum_{n'=0}^{N'-1} (S^{-1})_{p,n'} S_{n',n}.$$ Eqn. (8)

Since the last summation is equal to the identity matrix (i.e.

$$\sum_{n=0}^{N-1} (S^{-1})_{p,n} S_{n,m} = \delta_{p,m} \text{ where } \delta_{p,m}$$

is the Kronecker delta function), we have $$\tilde{v}_{p,q,k} = e^{-j\frac{2\omega_q}{c}(r+v(q+kQ)N'\Delta t)} e_p(\Omega).$$ Eqn. (9)

This result clearly shows that the variable p indexes the pth antenna array element.

Linear combinations of these functions over the index p may be taken to form receive beam patterns with the desired characteristics (pointing direction, sidelobes, etc.). For example, we may form a beam in direction $\Omega'$ by choosing the elements weights to be the conjugate of the signals due to a target in the direction $\Omega'$, with the elements possibly multiplied by an aperture taper $w_p$ for sidelobe control:

$$\tilde{v}_{q,k} = e^{-j\frac{2\omega_q}{c}(r+v(q+kQ)N'\Delta t)} \sum_{p=0}^{N-1} \alpha_p(\Omega') e_p(\Omega).$$ Eqn. (10)

where $\alpha_p(\Omega') = w_p e_p^*(\Omega')$ are element weights.

Applying the mathematical operations described above, but retaining the original mixer signal expression $v_{n',q,k}$ allows us to identify the signal mask values explicitly:

$$\tilde{v}_{q,k} = \sum_{p=0}^{N-1} \sum_{n'=0}^{N'-1} \alpha_p(\Omega')(S^{-1})_{p,n'} v_{n',q,k}$$ Eqns. (11)

$$= \sum_{n'=0}^{N'-1} \sum_{p=0}^{N-1} [\alpha_p(\Omega')(S^{-1})_{p,n'}] v_{n',q,k}$$

$$= \sum_{n'=0}^{N'-1} s_{n'}(\Omega') v_{n',q,k}$$

The numbers $s_p$, ($\Omega'$) are the N' complex numbers forming the signal mask, one set for each desired beam direction $\Omega'$. From the last equation in Eqns. (11) above, one multiplies N' successive signal samples $v_{n',q,k}$ by the mask values $s_n(\Omega')$ and adds them up. The choice of the element weights $\alpha_p(\Omega')$ in Eqns. (11) determine the main beam width and sidelobe performance, as is well known to those skilled in the art. The reader should take note that $s_n(\Omega')$ (with a lower case s) are the N' complex numbers forming the signal mask for each direction $\Omega'$ whereas $S_{n',n}$ (with an upper case S) is the coding matrix. The relationship between these two is shown in Eqns. (11).

The range and velocity estimates are then made in the usual manner, such as taking a 2D discrete FFT of Eqn. (11) over the indices q and k. The result will be an ambiguity function that provides estimates of the range, velocity, and bearing angles for scatterers (objects) 8 located with the field of view of the radar.

FIGS. 4a-4d shows the result of a computer simulation of CAR using the processing technique described herein. A set of sixteen orthogonal codes was used on receive only. The codes were inverted using the techniques described with reference to Eqns, 2 through 10, above. For the simulation we assumed a linear receiving antenna array of sixteen z-directed dipoles and considered beams only in the x-y plane so that we needed only consider the polar variable $\phi$. For a single point target one can see that the location of the target in the range, velocity, and phi ($\phi$) spaces is well defined. The table below shows some of the parameters of the simulation, including N (codes per frequency step), Q (frequency steps per sweep), and K (number of sweeps):

| Parameter | Value |
|---|---|
| N | 16 |
| Q | 64 |
| K | 64 |
| Range | 13 m |
| Vel | 10 m/s |
| Az | 0 deg |

For comparison, FIGS. 5a-5d show the simulation results using a coding scheme with a different code for every frequency step (and different from sweep to sweep). The parameters set forth in the preceding table where also used in this simulation. As one can clearly see the residual ambiguity (multiplicative noise) that results from this prior coding scheme. This "noise" is due to an insufficient number of measurements as compared to the number of unknowns.

For a further comparison, FIGS. 6a-6d show another simulation result using a coding scheme, with a different code for each sweep. The parameters set forth in the preceding table where also used in this simulation. Now the multiplicative noise is absent from the range space, but present (and stronger) in the velocity and azimuth spaces.

In the prior U.S. patent application Ser. No. 13/490,607 referenced above, at paragraph 0047 thereof, we describe how the phase shifter states change relative to the frequency sweep. In that application we described using a fixed set of phase shifter states per frequency sweep, and changing the code from sweep to sweep. For that application there are K codes, where K is equal to the number of sweeps over the field of view (FOV). Increasing the number of codes to Q times K, where Q equals the number of transmitted frequency shifts per sweep, by changing the phase shifter states at each frequency step, reduces the residual ambiguity further, but does not eliminate it. But including N codes per frequency step for a total of N' times K times Q codes eliminates the residual ambiguity that we want to overcome. As N' increases the residual ambiguity drops. However, one need to not increase N' to infinity. When N' is equal to the number of phase shifters 12 (the number of which shifters is equal to N), one can invert the code and determine the signals at each element. This allows one to create a set of beams for the array, and the resulting range/Doppler/angle estimates are free from the type of ambiguity which occurs when N' is less than the number of receiving elements (or phase shifters). Thus, preferably N' is equal to N, that is, N' is preferably equal to the total number of phase shifters 12, and this is true regardless of whether the receiving antenna elements 10 are arranged in a 1D or a 2D array.

Following the 2D FFT processing, the significant scatterers are typically identified by applying "thresholding" to the data outputted from the 2D FFT processing where any samples crossing a chosen threshold are retained and samples falling below that threshold are omitted. Additional processing may be applied to group significant samples together in order to identify single, large objects that may produce many different, but related, scattering events. Using such processing techniques, the radar sensor can provide functions such as, for example, identification of objects on a collision path with the host vehicle.

CAR Coding on Receive Only Vs CAR Coding on Both Receive and Transmit

In theory this invention can be also used on the transmit side of the radar. But in practice there are difficulties in doing this. To keep the processing simple and fast (with low latency), FFT processing of the range/Doppler signals is preferred. But to use FFT processing one must make sure the frequency sweep period is much longer (>10 times) than the time delay to the furthest target and back. And one also has to make sure that the sweep period is short enough to sample the Doppler signal without aliasing. The result is that one is not free to choose the sweep period arbitrarily, so one cannot simply increase the sweep period when one increases the number of codes per frequency step. If many different transmitted codes are reflected back by targets at different ranges and are received in a single sweep period, one must use correlation processing to determine when each code has arrived. This is much more complicated and computationally expensive than the receive-side FFT processing techniques described above, so we prefer to use CAR processing only on the received radar signals for low cost applications such as using CAR in an automotive radar application. But in military applications where cost is of less concern, it is certainly possibly use CAR on transmit or on both transmit and receive. In fact, one could then make the coding intervals (on transmit) very short and treating the radar as a phase coded radar to determine range. When viewed this way, employing CAR on transmit is essentially a phase coded radar that transmits a different phase code in every direction (e.g., over index p).

CAR coding on receive does not suffer the timing issues discussed in the preceding paragraph because the coding is all done at the same time so there need be no time delays with respect to the coding (when using CAR on in the radar receiver).

From these two comparisons one can see the advantages of the present invention in reducing multiplicative noise and thereby increasing the sensitivity and dynamic range of radar using CAR.

The accompanying Appendix A is an article which will be published after the filing date of this patent application. Appendix A, which is incorporated herein by reference, provides additional background information and addition technical information regarding the advantages and drawbacks of this invention compared with other radar schemes.

This concludes the description of embodiments of the present invention. The foregoing description of these embodiments has been presented for the purposes of illustration and description. It is not intended to be exhaustive or to limit the invention to the precise form or methods disclosed. Many modifications and variations are possible in light of the above teachings. It is intended that the scope of the invention be limited not by this detailed description, but rather by the claims appended hereto.

What is claimed is:

1. A radar system for estimating range, range rate (velocity) and bearing angles of one or more targets or objects reflecting at least one transmitted RF signal, the radar system comprising:
    a transmitter for transmitting the at least one transmitted RF signal, the transmitted signal changing in frequency during each sweep made by the radar system, the transmitter making K sweeps per acquisition and each sweep having Q frequency shifts per sweep;
    an array of N antenna elements for receiving the at least one RF signal;
    an array of single bit modulators, each single bit modulator in said array of single bit modulators being coupled with a corresponding antenna element or with a corresponding subgroup of said antenna elements in said array of antenna elements for modulating signals from the corresponding antenna elements according to a multibit code, wherein the number unique codes from which said mutibit code is selected is equal to N, with N unique codes being repeated Q·K times during each acquisition;
    a mixer;
    a summation network for applying a summation of signals from the array of single bit modulators to said mixer, the mixer outputting in-phase and quadrature output signals;
    one or more analog to digital converters for detecting and converting in-phase and quadrature output signals from the mixer to corresponding digital signals;
    means for applying S signal masks to the corresponding digital signals to thereby generate S different masked versions of the corresponding digital signals;
    means for summing said S different masked versions of the corresponding digital signals to produced summed versions thereof; and
    means for performing a two dimensional FFT processing of the summed versions of the S different masked versions of the corresponding digital signals, to estimate the range, range rate (velocity) and bearing angles of said one or more targets or objects.

2. The apparatus of claim 1 wherein the array of single bit modulators comprise an array of two state phase shifters.

3. The apparatus of claim 2 wherein the two state phase shifters are 0°/180° phase shifters.

4. The apparatus of claim 1 wherein the means for applying S signal masks to the corresponding digital signals to thereby generate S different masked versions of the corresponding digital signals is a multiplier.

5. The apparatus of claim 4 wherein the means for analyzing the corresponding digital signals further includes thresholding means applied to data generated by the two dimensional FFT processing to discard data which does not exceed a selected threshold.

6. The apparatus of claim 1 wherein the array of single bit modulators comprises an array of N single bit modulators and wherein each antenna element in the array of N antenna elements is coupled to a separate single bit modulator in the array of N single bit modulators.

7. The apparatus of claim 1 wherein the transmitter transmits N codes during each frequency shift of the at least one transmitted RF signal.

8. A method for determining the range of one or more scattering objects reflecting radar signals which occur in sweeps, with K sweeps utilized to cover an acquisition of a field of view and Q frequency shifts occurring during at least one sweep, the method comprising:
    utilizing an array of N antenna elements, the array of antenna elements each antenna element in said array having an associated two state modulator;
    coding energy received at said array according to a sequence of multibit codes, the number of unique codes in said sequence of codes is equal to N, with N unique codes being repeated Q·K times during each acquisition;
    thereby allowing the determination of range through digital computation after the scattered signals have been received.

9. The method of claim 8 wherein transmitted and/or received energy is 0/180 degree phase encoded with respect to each element of the array of antenna elements according to the sequence of said multibit codes.

10. The method of claim 8 wherein the associated two state modulators form an array of associated two state modulators of size N so that each of the antenna elements in the array of N antenna elements is individually coupled to a single associated two state modulator in the array N associated two state modulators.

11. The method of claim 8 wherein the digital computation includes Fast Fourier Transform (FFT) processing of the energy received at said array according to said sequence of multibit codes.

12. A method for reducing noise in a coded aperture radar system, the radar system transmitting signals which occur in sweeps, with K sweeps utilized to cover an acquisition of a field of view and Q frequency shifts occurring during at least one sweep, the method comprising:
    utilizing an array of N antenna elements, the array of antenna elements each having an associated two state modulator coupled therewith;
    coding energy received at said array according to a sequence of multibit codes, the number of unique codes in said sequence of codes is equal to N', with N' unique codes being repeated Q·K times during each acquisition;
    thereby reducing noise in said radar system compared to a coded aperture radar system radar system having fewer than N' codes in its sequence of multibit codes.

13. The method of claim 12 wherein transmitted and/or received energy is 0/180 degree phase encoded with respect to each element of the array of antenna elements according to the sequence of said multibit codes.

14. The method of claim 12 wherein the associated two state modulators form an array of associated two state modulators of size N so that each of the antenna elements in the array of N antenna elements is individually coupled to a single associated two state modulator in the array N associated two state modulators.

15. The method of claim 12 wherein the digital computation includes Fast Fourier Transform (FFT) processing of the energy received at said array according to said sequence of multibit codes.

16. A method of improving the sensitivity and dynamic range of a radar system performing radar sweeps during an acquisition of a field of view, each sweep having a different transmit frequency associated therewith, the method comprising using a set of N aperture codes to control N single bit modulators during each frequency step of the radar system, the N single bit modulators each being coupled to a single antenna element of an array of N antenna elements of the radar system.

17. The method of claim 16 wherein the number N of aperture codes equals the number N of single bit modulators.

18. A method of improving the sensitivity and dynamic range of a radar system performing radar sweeps during an acquisition of a field of view, each sweep having a different transmit frequency associated therewith, the method comprising using a set of aperture codes to control a plurality of single bit modulators during each frequency step of the radar system, each of the plurality of single bit modulators being coupled to a single antenna element of an array of antenna elements of the radar system.

19. The method of claim 18, wherein the number of aperture codes in said set of aperture codes equals the number of single bit modulators in said plurality of single bit modulators.

20. A method of improving the sensitivity and dynamic range of a radar system performing radar sweeps during an acquisition of a field of view, each sweep having a plurality of different transmit frequencies associated therewith, the method comprising using a set of aperture codes to control a plurality of single bit modulators during each frequency step of each sweep of the radar system, the plurality of single bit modulators each being coupled to a single antenna element of an array of antenna elements of the radar system.

21. A radar system comprising:
a transmitter for transmitting the at least one transmitted RF signal, the transmitted signal changing in frequency during each sweep made by the radar system, the transmitter making multiple sweeps over a field of view and wherein each sweep has multiple frequency shifts per sweep;
an array of antenna elements for receiving the at least one RF signal;
an array of modulators operated, configured or utilized in a single bit mode of operation, each modulator in said array being coupled with a corresponding antenna element or with a corresponding subgroup of said antenna elements in said array of antenna elements for modulating signals emanating from the corresponding antenna elements according to a multibit code;
a mixer;
a summation network for applying a summation of signals from the array of single bit modulators to said mixer, the mixer outputting in-phase and quadrature output signals;
one or more analog to digital convertors for detecting and converting in-phase and quadrature output signals from the mixer to digital signals;
digital means for determining, from said digital signals, range, range rate (velocity) and bearing angles of one or more targets or objects located in a field of view of the at least one transmitted RF signal.

* * * * *